Patented Mar. 9, 1954

2,671,762

UNITED STATES PATENT OFFICE 2,671,762

PROCESS FOR RESOLVING EMULSIONS

Thomas G. Wisherd, Tulsa, Okla., assignor to Sinclair Refining Company, New York, N. Y., a corporation of Maine No Drawing. Application March 24, 1951,
Serial No. 217,400

6 Claims. (Cl. 252—332)

My invention relates to the resolving of emulsions of the water-in-oil type. In particular, I have found that an oil-soluble neutralized sulfonated mixture of polyalkylated benzenes when added to water-in-petroleum or water-in-crude oil type emulsions in small proportions are especially effective in resolving the emulsions.

Well fluids obtained in the production of petroleum are often characterized by high proportions of water, either fresh or brine, together with the crude oil. The crude oil is frequently a petroleum emulsion of the water-in-oil type which comprises fine droplets of naturally-occurring water or brine dispersed in more or less permanent state throughout the oil which constitutes the continuous phase of the emulsion. Before the oil can be refined it is necessary to break the emulsion and remove the salt and/or water. Furthermore, it is customary during the refining operations to wash the crude oil with fresh water to remove inorganic impurities. In these washing operations further water-in-oil type emulsions are prepared under controlled conditions which also must be resolved.

I have found that these emulsions of the water-in-oil type can be more effectively resolved by the introduction of a small proportion of an oil-soluble neutralized sulfonated mixture of polyalkylated benzenes. The useful materials are derived from the bottoms from the production of dodecylbenzene (Neolene) and hereafter are referred to as the neutralized sulfonated Neolene bottoms or the demulsifier. The neutralized sulfonated Neolene bottoms I use are prepared by the sulfonation and subsequent neutralization of the bottoms produced in the manufacture of monododecylbenzene, i. e., the bottoms remaining after fractionation to remove the monododecylbenzene cut from the reaction products of dodecene with benzene, which bottoms consist essentially of di-dodecylbenzene along with other polyalkylated benzene molecules. The effective proportion of the demulsifier is in the range approximating one part of demulsifier per one thousand to fifty thousand parts of the water-in-oil type emulsion at normal temperatures.

Oil-soluble sulfonates have long been recognized as important demulsifying agents, as witness the widespread use of the oil-soluble petroleum mahogany sulfonates even to the present time. However, the ammonium and alkali salts of the usual materials sulfonated for use as demulsifiers have in general proven too water-soluble to give the best results. Consequently the oil solubility of my ammonia neutralized sulfonated Neolene bottoms was not to be expected. This is especially true in view of the repeated efforts to secure less water soluble-more oil soluble sulfonates by neutralization with various amines, or esterification with higher alcohols, glycols, and hydroxy amines. Such operations are expensive but due to the limited supply of petroleum mahogany sulfonates, were often the only available source of oil soluble sulfonates.

The following example is offered to more clearly illustrate the surprising effectiveness of my neutralized sulfonated Neolene bottoms as a demulsifier. However it must be realized that the tests of the example were run on a specific crude oil emulsion. Since it is well known that emulsions from different oil fields or even from different wells in the same field vary widely in stability and composition, these factors must be considered in drawing any conclusions therefrom. Also it is well known that a particular demulsifier may show superior emulsion resolving properties over those shown by other demulsifiers in an emulsion from a particular well or field and show inferior properties to the same or other demulsifiers in another well or field. Consequently demulsifiers are customarily selected for use in crude oil emulsions from a particular well or field according to the type of crude oil in that well or field. Thus to meet the specific requirements of a particular emulsion my demulsifier may be used alone or together in admixture with other known demulsifying agents with other specific properties.

Example I

A Mid-Continent pipe line crude was thoroughly emulsified with fresh water for the removal of inorganic salts. Three effective demulsifying chemicals containing the best practicable sulfonate concentration were developed for the resolving of this emulsion.

Blend A.—This blend consisted of 80% by volume of a water soluble ammonia neutralized sulfonate of an alkylated aromatic hydrocarbon and 20% by volume of an oxyalkylated fatty oil.

Blend B.—This blend consisted of 80% by volume of a commercial oil soluble petroleum sulfonate and 20% by volume of the same modified fatty oil.

Blend C.—This blend consisted of 80% by volume of my ammonia neutralized sulfonated Neolene bottoms and 20% by volume of the same modified fatty oil used in Blends A and B.

One part of Blends A or B would resolve 8,000 parts of the fresh water emulsion at a temperature of 160° F. in 20 minutes. One part of Blend C would resolve 10,000 parts of the same emulsion under the same conditions of time and temperature. Thus my demulsifier exhibits unusual effectiveness in resolving water-in-oil type emulsions in that when used in the same proportions as other demulsifiers, it will resolve the emulsion in a shorter period of time; or when used in smaller proportions than other demulsifiers, it will resolve the emulsion in the same period of time.

In the practice of my invention, I customarily dilute the acid sulfonated bottoms, with isopropanol, water, and a non-volatile highly aromatic petroleum solvent before neutralization. However the amount and type of diluent added to the acid sulfonates prior to neutralization is not an essential part of the product and may be varied as desired or eliminated entirely depending upon the use of the sulfonates. The diluent is added only for the purpose of reducing the viscosity of the sulfonates to facilitate handling. Advantageously I employ anhydrous ammonia as the neutralizing agent. However in some demulsifying uses amine neutralized sulfonated Neolene bottoms, although more expensive to prepare, have displayed the maximum efficiency. Neutralization with sodium, potassium or the alkaline earth metals may be used but the products of such neutralizations are generally not as efficient demulsifiers as the ammonia or amine neutralized products. Furthermore, I prefer to employ the neutralized sulfonated Neolene bottoms, in the dilute form, admixed with an oxyalkylated fatty oil, such as the condensation product of ethylene oxide and palm oil, the proportions of such admixture being approximately 80% by volume of the dilute sulfonate and about 20% by volume of the modified fatty oil.

As I have stated, the amounts of the neutralized sulfonated bottoms employed are between one part per one thousand and one part per fifty thousand parts of the water-in-oil type emulsion. Less than the minimum amount is generally ineffective in resolving the emulsion while over the maximum amount is unnecessary and wasteful of the demulsifier. The actual amount of the demulsifier employed within the above range depends ordinarily upon the type of water in the water-in-oil emulsion and upon the temperature of the emulsion, assuming that it is desired to resolve the emulsion in the most efficient manner in the shortest possible time.

An illustration of the method of preparation of my novel neutralized sulfonated Neolene bottoms, is presented in the following example.

Example II

The bottoms from the production of dodecylbenzene which I employed in producing this particular concentrate were "Neolene 400 Bottoms" obtained commercially from the Sharples-Continental Corporation. Typical physical properties of "Neolene 400 Bottoms" are as follows:

Engler range:
| | | |
|---|---|---|
| IBP | °F__ | 644 |
| 1% | °F__ | 671 |
| 2 | °F__ | 685 |
| 3 | °F__ | 690 |
| 4 | °F__ | 695 |
| 5 | °F__ | 698 |
| 20 | °F__ | 723 |
| 50 | °F__ | 739 |
| 70 | °F__ | 753 |
| 90 | °F__ | 775 |
| 92 | °F__ | 777 |
| 93 | °F__ | 778 |
| 94 | °F__ | 779 |
| 96 | °F__ | 780 |
| 97 | °F__ | 780 |
| 98 | °F__ | 780 |
| FBP | °F__ | 780 |
| Per cent rec. | | 99 |
| Spec. gravity at 100° F | | 0.8639 |
| Spec. gravity at 130° F | | 0.8545 |
| Viscosity in centipoises at 130° F | | 45.8 |
| Color | | Dark brown |
| Molecular weight | | 403±15 |

"Neolene 400 Bottoms" were charged in the amount of 1888 pounds to a conventional type Monel sulfonator and sulfonated by the addition of commercial 20% oleum totaling 1782 pounds. The mass was agitated continuously during the addition of the oleum and the temperature was held to a maximum of 147° F. by the circulation of cooling water through continuous coils located in the acid mass, and by the rate of oleum addition. The total time required for oleum application was 50 minutes.

The acid mass was next washed by the gradual application of 1335 pounds of water. Agitation was continued during the washing operation and until the sulfonated bottoms-diluted acid mass was pumped to the settler. Due to the heat evolved by dilution of the partially spent oleum during the washing operation the temperature rose rapidly. The washing temperature was held to a maximum of 196° F. by controlling the rate of addition of the water and by means of the cooling coils. The time required for the washing operation was 90 minutes and the final temperature was 185° F. The washed sulfonated mixture was then pumped to a glass-lined, water-jacketed settling tank which had been brought to 185° F. by injecting steam into the water in the jacket. The mass was allowed to settle without any further application of heat for a period of 16 hours. At the end of the 16 hour settling period the temperature of the mass was 152° F.

The diluted acid was now drawn from the bottom of the settler and discarded. The acid sulfonates, containing only a small amount of dilute sulfuric acid, were drawn to a neutralizing vessel and diluted with 18 gallons of 99% isopropanol, 18 gallons of water, and 35 gallons of a non-volatile, highly aromatic petroleum solvent. The diluted acid sulfonates were neutralized by the addition of 122 pounds of anhydrous ammonia, and the finished product drawn to drums for storage. The yield was 356 gallons. The material produced by the above process may or may not contain some excess ammonia. It is a semi-viscous fluid at atmospheric temperatures and is miscible in all proportions with paraffinic petroleum oils such as kerosene and low viscosity white oils.

Tests and the compositions of three typical concentrates follow:

| | | −25 | |
|---|---|---|---|
| Pour | ------ | ------ | ---- |
| Nitrogen, Percent | 2.83 | 2.24 | 2.12 |
| Sulfur, Percent | 4.68 | 4.52 | 4.57 |
| Acid No | 70.3 | 90.2 | 77.3 |
| Saponification No | 99.7 | 96.6 | 86.8 |
| Ash | .278 | .002 | .013 |

I claim:

1. A process for resolving emulsions of the water-in-oil type, characterized by subjecting the emulsion to the action of a demulsifying agent prepared by the sulfonation and neutralization of the bottoms produced in the manufacture of dodecylbenzene which bottoms consist essentially of didodecylbenzene and other polyalkylated benzenes.

2. A process according to claim 1 in which the neutralizing agent is ammonia.

3. A process for resolving emulsions of the water-in-oil type, characterized by subjecting the emulsion to the action of a demulsifying agent prepared by the sulfonation and neutralization of the bottoms produced in the manufacture of dodecylbenzene which bottoms consist essentially of didodecylbenzene and other polyalkylated benzenes in the amount of one part per one-thousand to fifty-thousand parts of the emulsion.

4. A process according to claim 3 in which the neutralizing agent is ammonia.

5. A process according to claim 1 in which the neutralizing agent is a ternary nitrogen base.

6. A process according to claim 3 in which the neutralizing agent is a ternary nitrogen base.

THOMAS G. WISHERD.

References Cited in the file of this patent

UNITED STATES PATENTS

| Number | Name | Date |
| --- | --- | --- |
| 1,596,596 | De Groote | Aug. 17, 1926 |
| 2,110,837 | Blair | Mar. 8, 1938 |
| 2,448,684 | Petrino | Sept. 7, 1948 |
| 2,543,223 | Blair | Feb. 27, 1951 |